(12) United States Patent
Aronzon et al.

(10) Patent No.: US 9,547,421 B2
(45) Date of Patent: *Jan. 17, 2017

(54) APPARATUS AND METHOD FOR MANAGING OPERATIONS OF ACCESSORIES

(71) Applicant: STEELSERIES ApS, Valby (DK)

(72) Inventors: Michael Aronzon, Ontario (CA); Jacob Wolff-Petersen, Richmond (GB); Tino Soelberg, Valby (DK)

(73) Assignee: STEELSERIES ApS, Frederiksberg (DK)

( * ) Notice: Subject to any disclaimer, the term of this patent is extended or adjusted under 35 U.S.C. 154(b) by 368 days.

This patent is subject to a terminal disclaimer.

(21) Appl. No.: 14/196,717

(22) Filed: Mar. 4, 2014

(65) Prior Publication Data

US 2014/0189565 A1  Jul. 3, 2014

Related U.S. Application Data

(63) Continuation of application No. 12/499,670, filed on Jul. 8, 2009, now Pat. No. 8,719,714.

(51) Int. Cl.
*G06F 3/048* (2013.01)
*G06F 3/0484* (2013.01)
*G06F 3/023* (2006.01)

(52) U.S. Cl.
CPC ............. *G06F 3/0484* (2013.01); *G06F 3/023* (2013.01); *A63F 2300/1018* (2013.01)

(58) Field of Classification Search
CPC .................................. G06F 3/048; A63F 9/24

USPC ......................... 715/762–764; 463/36, 37, 43
See application file for complete search history.

(56) References Cited

U.S. PATENT DOCUMENTS

| | | | |
|---|---|---|---|
| 6,071,194 | A | 6/2000 | Sanderson |
| 7,002,702 | B1 | 2/2006 | Machida |
| 7,383,327 | B1 | 6/2008 | Tormasov |
| 8,063,893 | B2 | 11/2011 | Rosenberg et al. |
| 8,212,772 | B2 | 7/2012 | Shahoian |
| 8,264,465 | B2 | 9/2012 | Grant et al. |

(Continued)

FOREIGN PATENT DOCUMENTS

| | | |
|---|---|---|
| DE | 102010030974 A1 | 3/2011 |
| GB | 2434228 | 7/2007 |

(Continued)

OTHER PUBLICATIONS

"ControllerMate v4.6", OrderedBytes, 2012.

(Continued)

*Primary Examiner* — Tadeese Hailu
(74) *Attorney, Agent, or Firm* — Guntin & Gust, PLC; Atanu Das

(57) ABSTRACT

A system that incorporates teachings of the present disclosure may include, for example, a computing device having a controller to present a plurality of associable actions and a plurality of accessories of distinct operational types, associate an action with an input function of a select one of the plurality of accessories, monitor the selected accessory for a stimulation of the input function, and transmit the action to an operating system to launch a first software application or to convey to a second software application the action or an aspect of the action. Additional embodiments are disclosed.

20 Claims, 7 Drawing Sheets

(56) References Cited

U.S. PATENT DOCUMENTS

| | | | |
|---|---|---|---|
| 8,313,379 B2 | 11/2012 | Ikeda et al. | |
| 8,378,979 B2 | 2/2013 | Frid et al. | |
| 8,418,085 B2 | 4/2013 | Snook et al. | |
| 8,436,821 B1 | 5/2013 | Plichta et al. | |
| 2001/0003713 A1 | 6/2001 | Willner et al. | |
| 2001/0011995 A1 | 8/2001 | Hinckley et al. | |
| 2002/0052230 A1 | 5/2002 | Martinek et al. | |
| 2004/0166940 A1 | 8/2004 | Rothschild | |
| 2004/0193441 A1 | 9/2004 | Altieri | |
| 2004/0229687 A1 | 11/2004 | Miyamoto et al. | |
| 2004/0261026 A1 | 12/2004 | Corson | |
| 2005/0035945 A1 | 2/2005 | Keenan et al. | |
| 2005/0183143 A1 | 8/2005 | Anderholm et al. | |
| 2005/0210417 A1 | 9/2005 | Marvit et al. | |
| 2005/0225530 A1 | 10/2005 | Evans et al. | |
| 2005/0239523 A1 | 10/2005 | Longman et al. | |
| 2006/0121990 A1 | 6/2006 | O'Kelley et al. | |
| 2006/0148578 A1 | 7/2006 | Hayes et al. | |
| 2006/0152495 A1* | 7/2006 | Gombert | G06F 3/03543 345/172 |
| 2006/0190270 A1 | 8/2006 | Luisi | |
| 2006/0211471 A1 | 9/2006 | Walker et al. | |
| 2006/0211494 A1* | 9/2006 | Helfer | G07F 17/3211 463/30 |
| 2007/0026935 A1 | 2/2007 | Wolf et al. | |
| 2007/0080934 A1 | 4/2007 | Chen et al. | |
| 2007/0149288 A1 | 6/2007 | Nickell et al. | |
| 2007/0259716 A1 | 11/2007 | Mattice et al. | |
| 2008/0174550 A1 | 7/2008 | Laurila et al. | |
| 2008/0214305 A1 | 9/2008 | Addington et al. | |
| 2008/0221885 A1 | 9/2008 | Lin | |
| 2008/0225041 A1 | 9/2008 | El Dokor et al. | |
| 2009/0054146 A1 | 2/2009 | Epstein et al. | |
| 2009/0085877 A1 | 4/2009 | Chang et al. | |
| 2009/0124387 A1 | 5/2009 | Perlman et al. | |
| 2009/0144621 A1 | 6/2009 | Sangster et al. | |
| 2009/0144624 A1 | 6/2009 | Barnes | |
| 2009/0163272 A1 | 6/2009 | Baker et al. | |
| 2009/0183098 A1* | 7/2009 | Casparian | G06F 3/0238 715/765 |
| 2009/0189858 A1 | 7/2009 | Lev et al. | |
| 2009/0303204 A1 | 12/2009 | Nasiri et al. | |
| 2009/0320055 A1 | 12/2009 | Langille et al. | |
| 2010/0113153 A1 | 5/2010 | Yen et al. | |
| 2010/0179856 A1 | 7/2010 | Paretti et al. | |
| 2011/0021272 A1 | 1/2011 | Grant et al. | |
| 2011/0034248 A1 | 2/2011 | Grever et al. | |
| 2011/0045912 A1 | 2/2011 | Bortnik | |
| 2011/0081969 A1 | 4/2011 | Ikeda et al. | |
| 2011/0086706 A1 | 4/2011 | Zalewski | |
| 2012/0071244 A1 | 3/2012 | Gillo et al. | |
| 2012/0313901 A1 | 12/2012 | Monson et al. | |
| 2012/0319989 A1 | 12/2012 | Argiro et al. | |
| 2012/0323521 A1 | 12/2012 | De Foras et al. | |
| 2013/0016042 A1 | 1/2013 | Makinen et al. | |
| 2013/0055162 A1 | 2/2013 | Arriola et al. | |
| 2013/0057299 A1 | 3/2013 | Unterreitmayer et al. | |
| 2013/0077820 A1 | 3/2013 | Marais et al. | |
| 2013/0090930 A1 | 4/2013 | Monson et al. | |
| 2013/0196757 A1 | 8/2013 | Latta et al. | |
| 2013/0273986 A1 | 10/2013 | Arnone et al. | |
| 2013/0303281 A1 | 11/2013 | Argiro et al. | |
| 2014/0129935 A1 | 5/2014 | Ovadia Nahon et al. | |
| 2014/0168100 A1 | 6/2014 | Argiro et al. | |
| 2014/0357372 A1 | 12/2014 | Garcia | |
| 2015/0089262 A1 | 3/2015 | Cairns | |

FOREIGN PATENT DOCUMENTS

| | | |
|---|---|---|
| WO | 2006/107296 A1 | 10/2006 |
| WO | 2011/130755 | 10/2011 |

OTHER PUBLICATIONS

"GestIC Technology Design Center", [http://www.microchip.com/pagehandler/en_us/technology/gestic, Apr. 29, 2013, 1 page.

"GestIC Technology Design Center", [http://www.microchip.com/pagehandler/en-us/technology/gestic/gettingstarted.html], Apr. 29, 2013, 1 page.

"Leap Motion", [https://www.leapmotion.com/], Apr. 29, 2013, 6 pages.

"Near and Far Field", [http://en.wikipedia.org/wiki/Near_and_far_field], Wikipedia, May 2, 2013, 10 pages.

"Siri. Your Wish is its command.", http://www.apple.com/ios/siri/, Apr. 24, 2013.

Microsoft, "Xbox 360 Limited Edition Metallic Silver Wireless Controller", http://www.microsoftstore.com/store/msstore/en_US/pd/ThemeID.27509700/Xbox-360-Limited-Edition-Metallic-Silver-Wireless-Controller/productID.246602800, Mar. 19, 2013.

Sony, "PS3 DualShock 3 Wireless Controller", http://www.gamestop.com/ps3/accessories/ps3-dualshock-3-wireless-controller/69638;, Mar. 19, 2013.

Ideazon Merc Stealth Illuminated Gaming Keyboard Review, Jan. 31, 2008. Available on the internet in Feb. 2009 under the URL https://web.archive.org/web/20090210152018/http://overclockersclub.com/reviews/ideazon_merc_stealth_illuminated_gaming_keyboard.

\* cited by examiner

600

APPARATUS AND METHOD FOR MANAGING OPERATIONS OF ACCESSORIES

CROSS-REFERENCE TO RELATED APPLICATION(S)

This application is a continuation of U.S. patent application Ser. No. 12/499,670 filed Jul. 8, 2009 by Aronzon et al., entitled "Apparatus and Method for Managing Operations of Accessories." All sections of the aforementioned application are incorporated herein by reference in its entirety.

FIELD OF THE DISCLOSURE

The present disclosure relates generally to accessory management applications, and more specifically to an apparatus and method for managing operations of accessories.

BACKGROUND

It is common today for gamers to utilize more than one gaming accessory. This is especially true of gamers who play Massively Multiplayer On-line (MMO) games in a team or individual configuration. Gamers can have at their disposal accessories such as a keyboard, a general purpose gaming pad, a mouse, a gaming console controller, a headset with a built-in microphone to communicate with other players, a joystick, a computer display, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to users.

DETAILED DESCRIPTION

One embodiment of the present disclosure entails a computer-readable storage medium having computer instructions to present in a graphical user interface a plurality of associable actions and a plurality of accessories of distinct operational types, associate one of the plurality of associable actions with an input function of a select one of the plurality of accessories, record the association of the action and the input function, detect a stimulation of the input function while monitoring the selected accessory in use, retrieve the action associated with the input function, and transmit the action to an operating system. The plurality of accessories can be for navigating in or controlling a software application operable in a computer system or a gaming console.

One embodiment of the present disclosure entails presenting in a graphical user interface a plurality of associable actions and a plurality of accessories of distinct operational types, receiving a request to associate one of the plurality of associable actions with an input function of a select one of the plurality of accessories, associating the action with the input function, monitoring the selected accessory for a stimulation of the input function, and transmitting the action to an operating system responsive to detecting the stimulation of the input function.

One embodiment of the present disclosure entails a computing device having a controller to present a plurality of associable actions and a plurality of accessories of distinct operational types, associate an action with an input function of a select one of the plurality of accessories, monitor the selected accessory for a stimulation of the input function, and transmit the action to an operating system to launch a first software application or to convey to a second software application the action or an aspect of the action.

Figure 1:
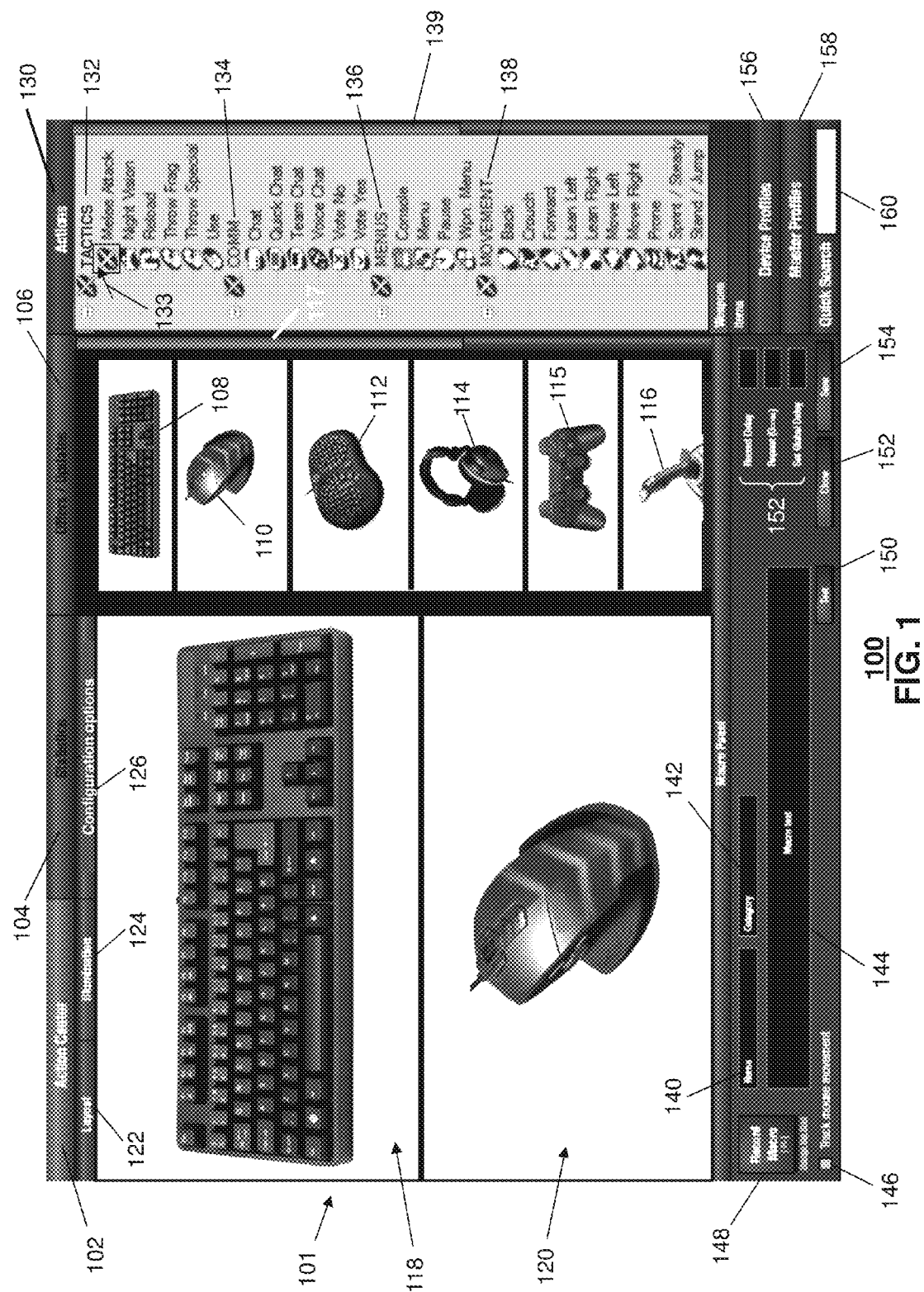
FIGS. 1-3 depict illustrative embodiments of a Graphical User Interface (GUI) generated by an Accessory Management Software (AMS) application according to the present disclosure.
Figure 2:
Figure 3:
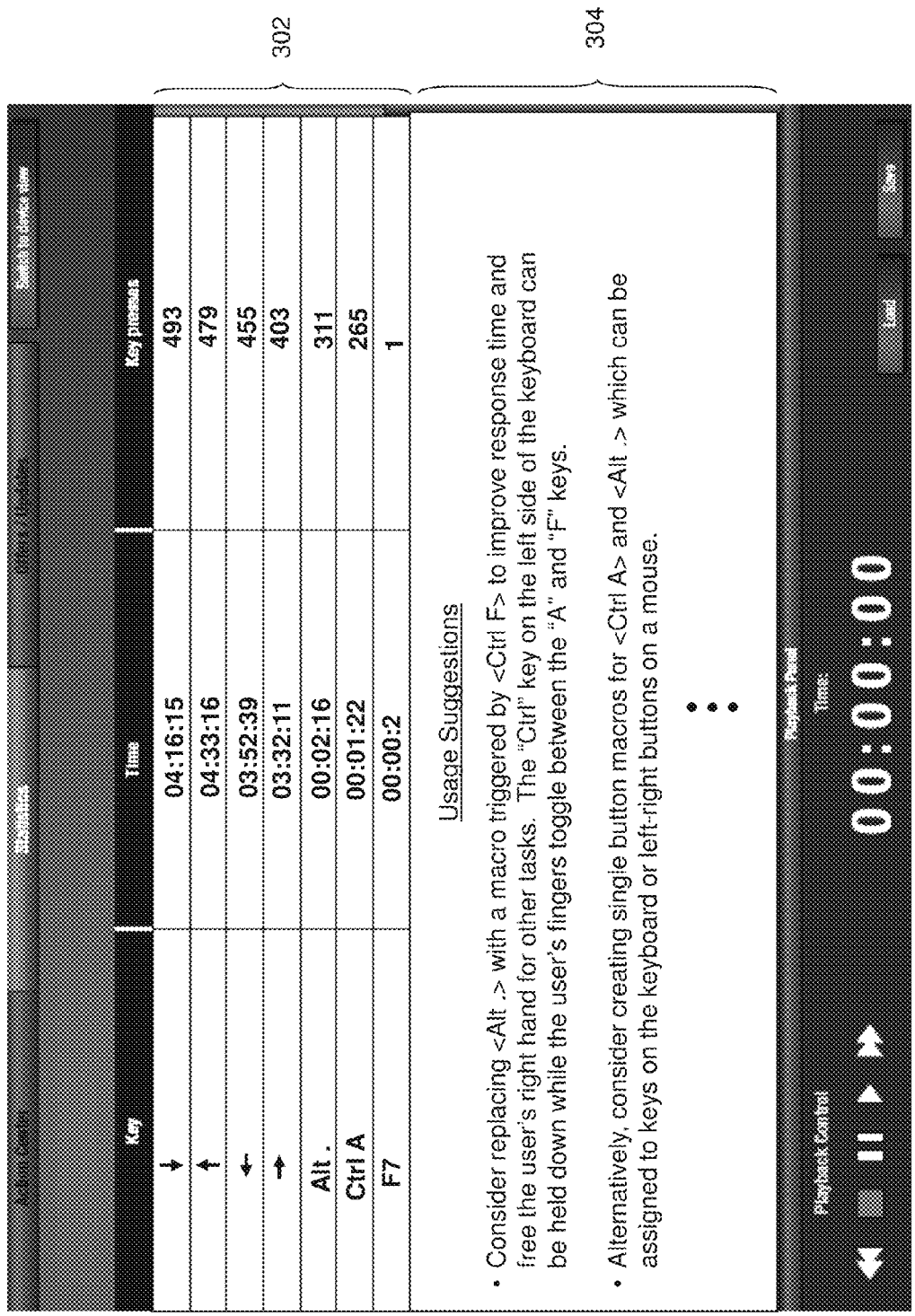

FIGS. 1-3 depict illustrative embodiments of a Graphical User Interface (GUI) generated by an Accessory Management Software (AMS) application according to the present disclosure. The AMS application can operate in a computing device such as a desktop computer, a laptop computer, a server, a mainframe computer, or a gaming console. A gaming console can represent a gaming device such as a Playstation 3™, a Wii™, or an Xbox360™. Other present and next generation gaming consoles are contemplated. The AMS application can also operate in other computing devices with less computing resources such as a cellular phone, a personal digital assistant, or a media player (such as an iPOD™). From these illustrations it would be apparent to an artisan with ordinary skill in the art that the AMS application can operate in any device with computing resources.

Figure 4:
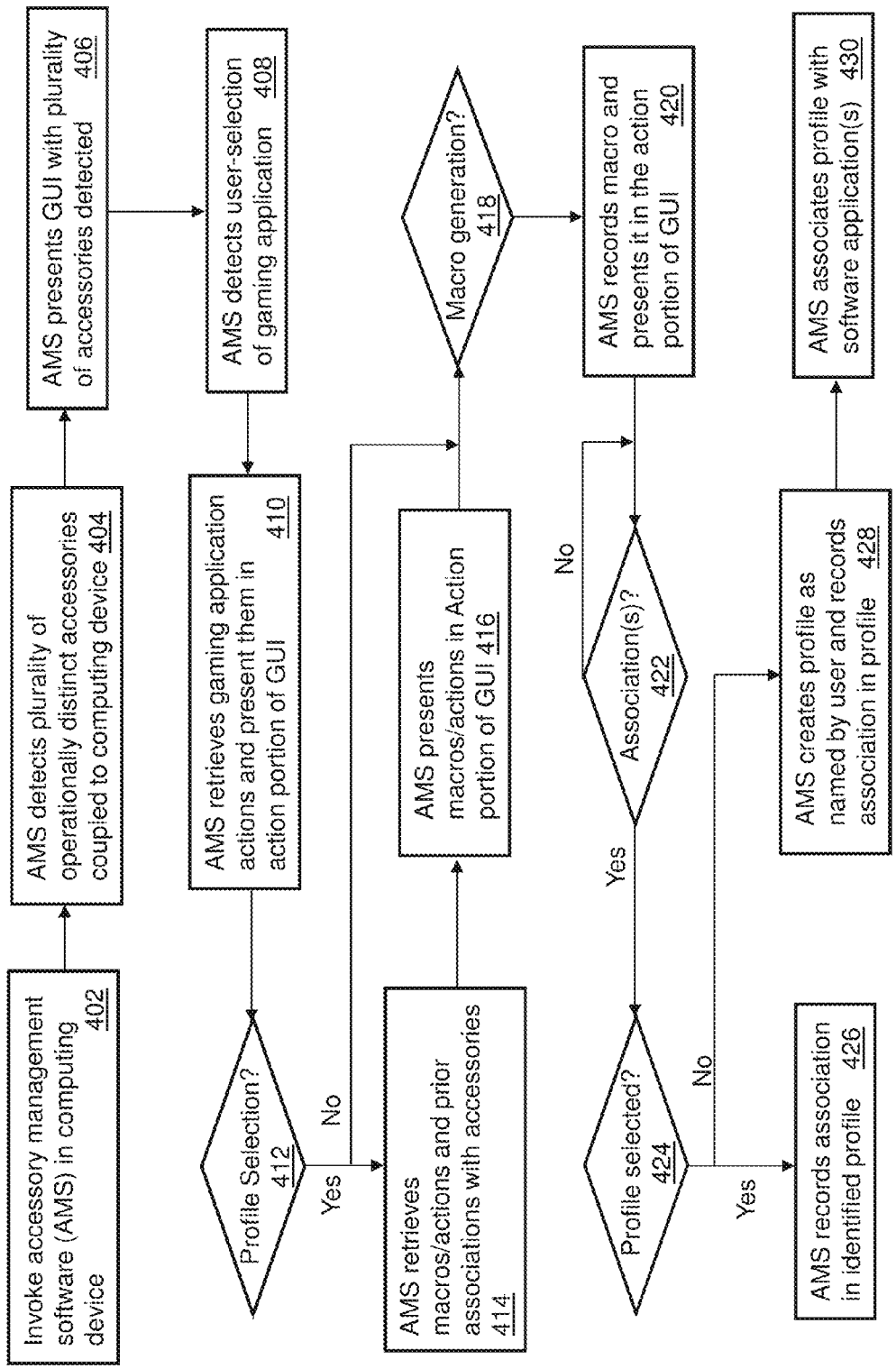
FIGS. 4-6 depict illustrative methods describing the operation of the AMS application.
Figure 5:
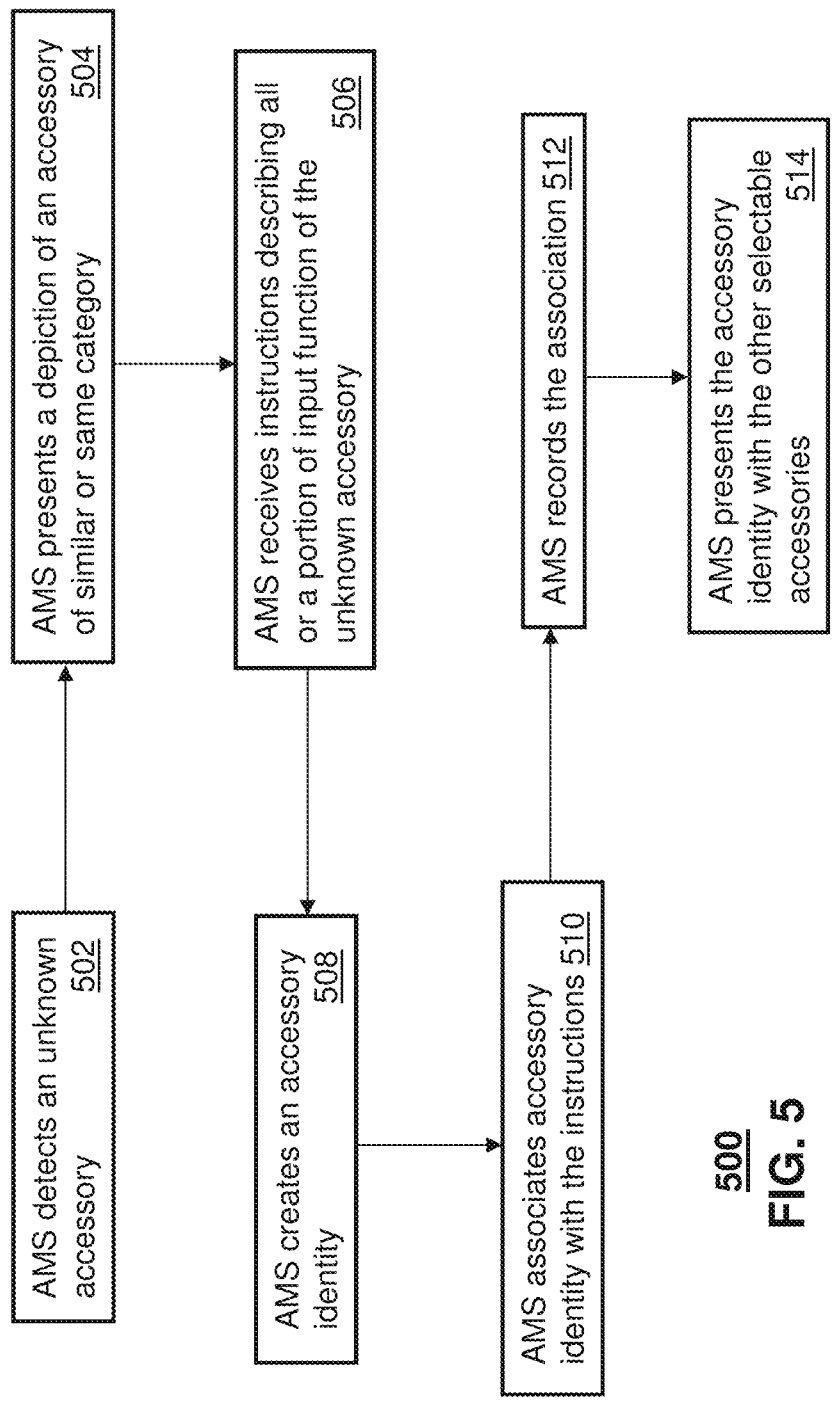
Figure 6:
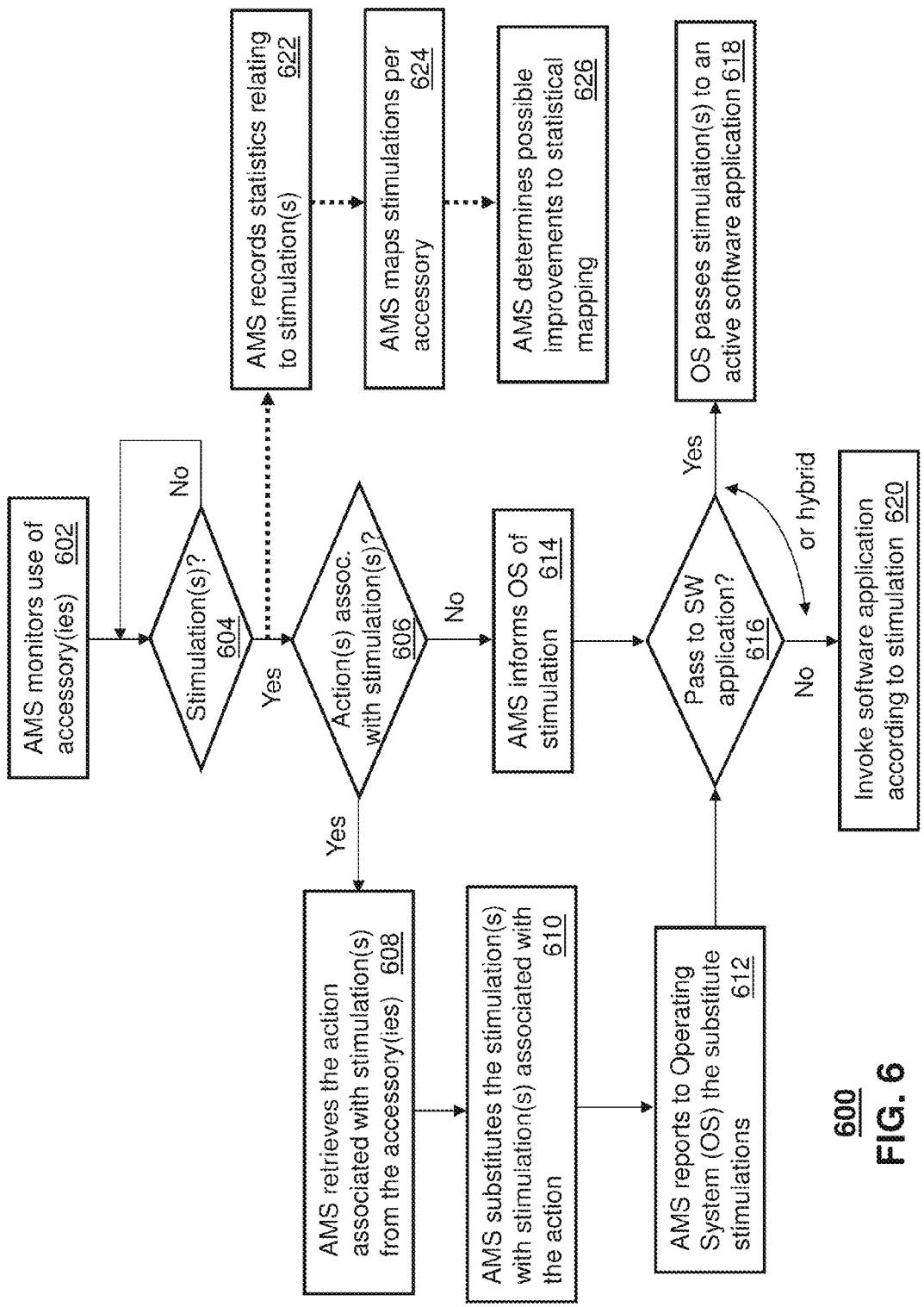

FIGS. 4-6 depict illustrative methods 400-600 describing the operation of the AMS application as shown in FIGS. 1-3. Method 400 can begin with step 402 in which the AMS application is invoked in a computing device. The invocation step can result from a user selection of the AMS application from a menu or iconic symbol presented on a desktop of the computing device by an operating system (OS) managing operations thereof. In step 404, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device and which can control aspects of the OS and/or a software application operating in the computing device. An accessory can represent for example a keyboard, a gaming pad, a mouse, a gaming console controller, a joystick, a microphone, or a headset with a microphone—just to mention a few. The keyboard and gaming pad represent accessories of a similar category since their operational parameters are alike.

A mouse, on the other hand, represents an accessory having disparate operational parameters from the keyboard or gaming pad. For instance, the operational parameters of a keyboard generally consist of alphanumeric keys, control keys (e.g., Shift, Alt, Ctrl), and function keys while the operational parameters of a mouse consist of navigation data generated by a tracking device such as a laser sensor, buttons to invoke GUI selections, and settings thereof (e.g., counts or dots per inch, acceleration, scroll speed, jitter control, line straightening control, and so on). Such distinctions can be used to identify disparate categories of accessories. The joysticks, game controllers or any other input devices represent additional categories of accessories supported by the AMS.

In step 406, the AMS application presents a GUI 101 such as depicted in FIG. 1 with operationally distinct accessories such as the keyboard 108 and mouse 110. The GUI 101 presents the accessories 108-116 in a scrollable section 117. One or more accessories can be selected by a user with a common mouse pointer. In this illustration, the keyboard 108 and mouse 110 were selected with a mouse pointer for customization. Upon selecting the keyboard 108 and mouse 110 in section 117, the AMS application presents the keyboard 108 and mouse 110 in split windows 118, 120, respectively, to help the user during the customization process.

In step 408, the AMS application can be programmed to detect a user-selection of a particular software application such as a game. This step can be the result of the user entering in a Quick Search field 160 the name of a gaming application (e.g., World of Warcraft™). Upon identifying a gaming application, the AMS application can retrieve in step 410 from a remote or local database gaming application actions which can be presented in a scrollable section 139 of the GUI represented as "Actions" 130. The actions can be tactical actions 132, communication actions 134, menu actions 136, and movement actions 138, or any other types of actions, which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories by way of a simple drag and drop action. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or mouse 110 to make an association with an input function of one of these accessories.

For example, the user can drag the Melee Attack symbol to the right mouse button thereby causing an association between the selection of the right mouse button and the gaming action of a Melee Attack. When the right button of the mouse 110 is selected during normal operation, the AMS application can detect the selection as a "trigger" to generate the key sequence "Ctrl A" which is understood by the gaming application as request for a Melee Attack. The gaming application receives from the AMS application by way of an operating system the "Ctrl A" sequence as if it had been generated by a Qwerty keyboard.

With this in mind, attention is directed to step 412 where the AMS application can respond to a user selection of a profile. A profile can be a device profile or master profile invoked by selecting GUI button 156 or 158, each of which can identify the association of actions with input functions of one or more accessories. If a profile selection is detected in step 412, the AMS application can retrieve macro(s) and/or prior associations of actions with the accessories as defined by the profile. The actions and/or macros defined in the profile can also be presented in step 416 by the AMS application in the actions column 130 of the GUI 101 to modify or create new associations.

In step 418, the AMS application can also respond to a user selection to create a macro. A macro in the present context can represent a subset of actions that can be presented in the Actions column 130. Any command which can be recorded by the AMS application can be used to define a macro. An command can represent a sequence of input functions of an accessory, identification of a software application to be initiated by an operating system (OS), or any other recordable stimulus to initiate, control or manipulate software applications. For instance, a macro can represent a user entering the identity of a software application (e.g., instant messaging tool) to be initiated by an OS. A macro can also represent recordable speech delivered by a microphone singly or in combination with a headset for detection by another software application through speech recognition or for delivery of the recorded speech to other parties. In yet another embodiment a macro can represent recordable navigation of an accessory such as a mouse or joystick, recordable selections of buttons on a keyboard, a mouse, or a mouse pad, and so on. Macros can also be combinations of the above illustrations. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, etc.) and/or by manual entry in field 144 (e.g., typing the name and location of a software application to be initiated by an OS). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to customize such timing. Once the macro has been fully defined, selection of button 154 records the macro in step 420. The recording step can be combined with a step for adding the macro to the associable items Actions column 130, thereby providing the user the means to associate the macro with input functions of the accessories.

In step 422, the AMS application can respond to drag and drop associations between actions and input functions of the keyboard 108 and the mouse 110. If an association is detected, the AMS application can proceed to step 424 where it can determine if a profile has been identified in step 412 to record the association(s) detected. If a profile has been identified, the associations are recorded in said profile in step 426. If a profile was not been identified in step 412, the AMS application can create a profile in step 428 for recording the detected associations. In the same step, the user can name the newly created profile as desired. The newly created profile can also be associated with one or more software applications in step 430 for future reference.

The GUI 101 presented by the AMS application can have other functions. For example, the GUI 101 can provide options for layout of the accessory selected (button 122), how the keyboard is illuminated when associations between input functions and actions are made (button 134), and configuration options for the accessory (button 126). Configuration options can include operational settings of the mouse 110 such as Dots Per Inch or Counts Per Inch, and so on. The AMS application can adapt the GUI 101 to present more than one functional perspective. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics in relation to the usage of accessories as depicted in FIGS. 2-3. Selecting button 106 can cause the AMS application to adapt the GUI 101 to present promotional offers and software updates.

It should be noted that the steps of method 400 in whole or in part can be repeated until a desirable pattern of associations of actions to input functions of the selected accessories has been accomplished. It would be apparent to an artisan with ordinary skill in the art that there can be numerous other approaches to accomplish similar results. These undisclosed approaches are contemplated by the present disclosure.

FIG. 5 depicts a method 500 in which the AMS application can be programmed to recognize unknown accessories so that method 400 can be applied to them as well. Method 500 can begin with step 502 in which the AMS application detects an unknown accessory such as a new keyboard from an unknown vendor by way of a communicative coupling to a computing device from which the AMS application operates. The AMS application in this instance can receive an identity from the keyboard or the operating system which is not known the AMS application. Upon detecting an unknown accessory, the AMS application in step 504 can present a depiction of an accessory of similar or same category in response to a user providing direction as to the type of accessory (by selecting for example a drop-down menu). Alternatively, or in combination with the user instructions, the AMS application can determine from the information received from the unknown accessory an accessory type.

In step 506 the AMS application can receive instructions describing all or a portion of the input functions of the unknown accessory. These instructions can come from a user who defines each input function individually or responds to inquiries provided by the AMS application. The AMS application can for example make an assumption as to the keyboard layout and highlight each key with a proposed function which the user can verify or modify. Once the AMS application has been provided instructions in step 506, the AMS application can create an accessory identity in step 508 which can be defined by the user. In steps 510 and 512, the AMS application can associate and record the accessory instructions with the identity for future recognition of the accessory. In step 514, the AMS application can present a depiction of the new accessory with its identity along with the other selectable accessories in section 117.

Method 500 can provide a means for universal detection and identification of any accessory which can be used to control or manage software applications operating in a computing device.

FIG. 6 depicts a method 600 for illustrating the AMS application responding to input function stimuli (triggers) of accessories. Method 600 can begin with step 602 in which the AMS application monitors the use of accessories. This step can represent monitoring the stimulation of input functions of one or more accessories communicatively coupled to a computing device from which the AMS application operates. The input functions can correspond to button depressions on a keyboard, gaming pad, or navigation device such as a mouse. The input functions can also represent navigation instructions such as mouse or joystick movements. The input functions can further represent speech supplied by a microphone singly or in combination with a headset. Other existing or future input functions of an accessory detectable by the AMS application are contemplated by the present disclosure. The AMS application can monitor input functions by for example processing human interface device (HID) reports supplied by the accessories to the computing device.

Once one or more stimulations have been detected in step 604, the AMS application can proceed to step 606 to determine if action(s) have been associated with the detected stimulation(s). If for example the stimulations detected correspond to keyboard and mouse button depressions, the AMS application can determine if actions have been associated and recorded for such stimulations. If these stimulations "trigger" one or more actions, the AMS application can proceed to step 608 where it retrieves the stimulation definition of these actions for each accessory reporting a stimulation. In step 610, the AMS application can substitute the detected stimulations with the stimulations defined by the action.

To illustrate this substitution, suppose for example that the detected stimulation was "Ctrl A" simultaneously depressed on a keyboard. Suppose further that an action associated with this stimulus consists of a macro that combines mouse clicks with a navigation of the mouse (e.g., moving the mouse quickly in a forward motion for a given distance), and a request to invoke an instant messaging (IM) session with a particular individual using Skype™ or some other common IM tool. In step 610, the AMS application would substitute "Ctrl A" for stimulations consisting of the mouse clicks, navigation and a request for an IM application. The substitute stimulations would then be reported in step 612 to an operating system (OS).

In step 616, the OS can determine whether to pass the substitute stimulations to an active software application in operation (e.g., a gaming application) and/or to invoke another software application. The active software application can be operating from the same computer system from which the OS and the AMS application operate or can be operating at a remote system such as an on-line server or family of servers (e.g., World of Warcraft) awaiting stimulation data from the computer system. In this illustration, the macro comprises both stimulation feedback for the active software application and a request to initiate an IM session. Accordingly, the OS conveys in step 618 the mouse stimulation signals to the active software application (e.g., gaming application), and in a near simultaneous fashion invokes the IM session in step 620 with a specific individual (or organization).

Referring back to step 606, the illustrations above cover a scenario in which the AMS application has detected an association of actions to accessory stimuli. If however the AMS application does not detect such an association, then the detected stimulus (or stimuli) supplied by one or more accessories is transmitted to the OS in step 614. For example, it may be that a stimulation based on the depressions of "Ctrl A" has no particular association to an action. In this case, the AMS application passes this stimulation to the OS with no substitutes. In step 616 the OS can determine if this stimulation invokes a new software application in step 620 or is conveyed to the previously initiated software application.

Contemporaneous to the embodiments described above, the AMS application can also record in step 622 statistics relating to the detected accessory stimulations. A portion of the AMS application can operate as a background process which performs statistical analysis on the stimulations detected. By selecting button 104 in FIG. 1, the AMS application can provide an updated GUI which illustrates the usage of input functions of one or more accessories for which stimulations were detected in step 604. For ease of illustration, only a keyboard accessory is shown. In this illustration, certain keys (references 204, 206 208, 210) on the keyboard are color-coded to illustrate the frequency of usage of these keys.

A color scale 203 defines the frequency of usage of the input functions of the keyboard. The first end of the scale (navy blue) represents a single detected depression, while an opposite end of the scale (bright red) represents 500 detected depressions. Based on this scale, the AMS application maps by color in step 624 stimulations of the keyboard. For example, the key grouping 208 depict a color coding with the highest detectable usage, while the F7 key (reference 210) indicates the fewest depressions. Keys having zero depressions are not color coded to readily identify the color mapping of keys which were used at least once.

The AMS application provides additional functions in a playback panel of the GUI which can help a user understand how the color coded keys were used during an active software application such as a video game. In this section of the GUI, the AMS application can present the user with a playback control function 202 which the user can select to replay, pause, forward or rewind the usage of these keys. When usage playback is selected, the user can for instance see the color coded keys highlighted in real-time with a temporary white border to visualize how the keys were selected. A time clock 204 provides the user the elapsed time of the playback sequence. Button 212 allows the user to retrieve statistics from other sessions, while button 214 provides the user a means to save statistics from a given session.

The GUI of FIG. 2 could have been shown as a split screen with all accessories which generated one or more detected stimulations (e.g., keyboard, mouse, and microphone), each providing statistical symbolic results as described above for the keyboard. Although not shown, split screen embodiments are contemplated by the present disclosure for the GUI of FIG. 2.

In addition to a symbolic representation as shown in FIG. 2, the AMS application can provide the user a means to visualize raw statistics in a table format such as shown in FIG. 3 by selecting button 212. The table format shows raw data in section 302 and possible suggestions in section 304 for improving user performance which can be generated by the AMS application in step 626. Section 302 can be presented in a table format with a column identifying the key being analyzed, its usage, and number of key presses. The user can ascertain from this table the most and least frequently used keys as well as other identifiable patterns.

The AMS application can utilize an understanding of the layout of the accessory (in this case, the keyboard) to determine from the statistics ways that the user can improve response time or ergonomic use. For example, the AMS application can determine from a layout analysis that the key combination <Alt .> can be reassigned to a macro based on the trigger <Ctrl F> which could provide the user a faster response time and free up the user's right hand for other tasks. The AMS application can also provide alternative suggestions. For example, the AMS application can also suggest creating single button macros for each of the key combinations <Alt .> and <Ctrl A> which can be assigned to keys on the keyboard or left and right buttons of a mouse. The latter suggestion of assigning macros to the mouse can help the user free up his/her left hand.

The AMS application can utilize present and next generation algorithms to determine how to improve response times and ergonomic usage of accessory devices. The AMS application can for example have at its disposal an understanding of the layout of each accessory, the type of software being controlled by the accessory (e.g., World of Warcraft), type of operations commonly used to control the software (e.g., known actions as shown in the actions column 130 of FIG. 1), an understanding of the associations made by other users (e.g., gamers) to improve their performance when controlling the software, and so on. The AMS application can also be adapted to communicate with the active software application by way of an Application Programming Interface (API) to receive additional usage statistics from the software which it can in turn use to improve the user's performance. The AMS application can also utilize common statistical and behavior modeling techniques to predict the behavior of the user and responses from the software application to identify possible ways to improve the user's performance.

From these illustrations, it would be apparent to an artisan of ordinary skill in the art that innumerable algorithms can be developed to analyze accessory usage and thereby suggest improvements. These undisclosed embodiments are contemplated by the present disclosure.

From the foregoing descriptions, it would be evident to an artisan with ordinary skill in the art that the aforementioned embodiments can be modified, reduced, or enhanced without departing from the scope and spirit of the claims described below. For example, method 400 can be adapted to define more than one programmable layer for an accessory. Such a feature can extend the functionality of an accessory into multi-layer paradigms of input functions. The GUI of FIG. 1 can be adapted so that a user can specify more than one programmable layer for a specific accessory.

The user can also specify which layer to present in FIG. 1 while associating actions. If for instance layer 1 is shown, the GUI of FIG. 1 can present the actions associated in this layer by presenting descriptors superimposed on the input functions (e.g., buttons or keys). When the user switches to layer 2 (e.g., by selecting from a drop-down menu the layer of interest) the accessory can be shown in the GUI with a different set of associated actions. The user can define a macro or identify a key sequence to switch between layers when the accessory is in use.

The trigger for switching between layers can be a toggle function (e.g., selecting the tab key on a Qwerty keyboard) to switch between layers in a round robin fashion (layer 1→layer 2→layer 3→to layer 1→and so on). Alternatively, the user can define a hold and release trigger to switch between layers. In this embodiment, the user moves to another layer while pressing a button (e.g., a "Shift" key) and returns to the preceding layer upon its release. In yet another embodiment, the trigger to switch layers can be defined differently per layer. The user can for example select the letter "A" in layer 1 to proceed to layer 2, and select the letter "B" in layer 2 to return to layer 1 or proceed to yet another layer 3. There can be numerous combinations of layers and triggers which can be defined to substantially expand the capability of single accessory. Additionally, triggers can be of any kind, tactile, speech, etc.

In another embodiment, method 400 can be adapted so that a user can define super macros and/or super profiles. A super macro can represent nested macros (combinations of macros). Method 400 can be adapted so that the user can customize the timing for executing nested macros. Similarly, a super profile can represent nested profiles (combinations of profiles). A super profile can for example comprise sub-profiles, each sub-profile defining associations of actions to input functions of a particular accessory.

In yet another embodiment, method 400 can be adapted to establish audio profiles for headset accessories. When a user select a headset accessory such as 114, GUI 101 can be adapted to provide the user options to establish an sound output (equalizer) setting to optimize performance for a particular gaming application. For instance GUI 101 can present an equalizer so that the user can raise the volume of high frequencies to an enemy's footsteps from a longer distance in a gaming application.

The foregoing embodiments are a subset of possible embodiments contemplated by the present disclosure. Other suitable modifications can be applied to the present disclosure. Accordingly, the reader is directed to the claims for a fuller understanding of the breadth and scope of the present disclosure.

Figure 7:
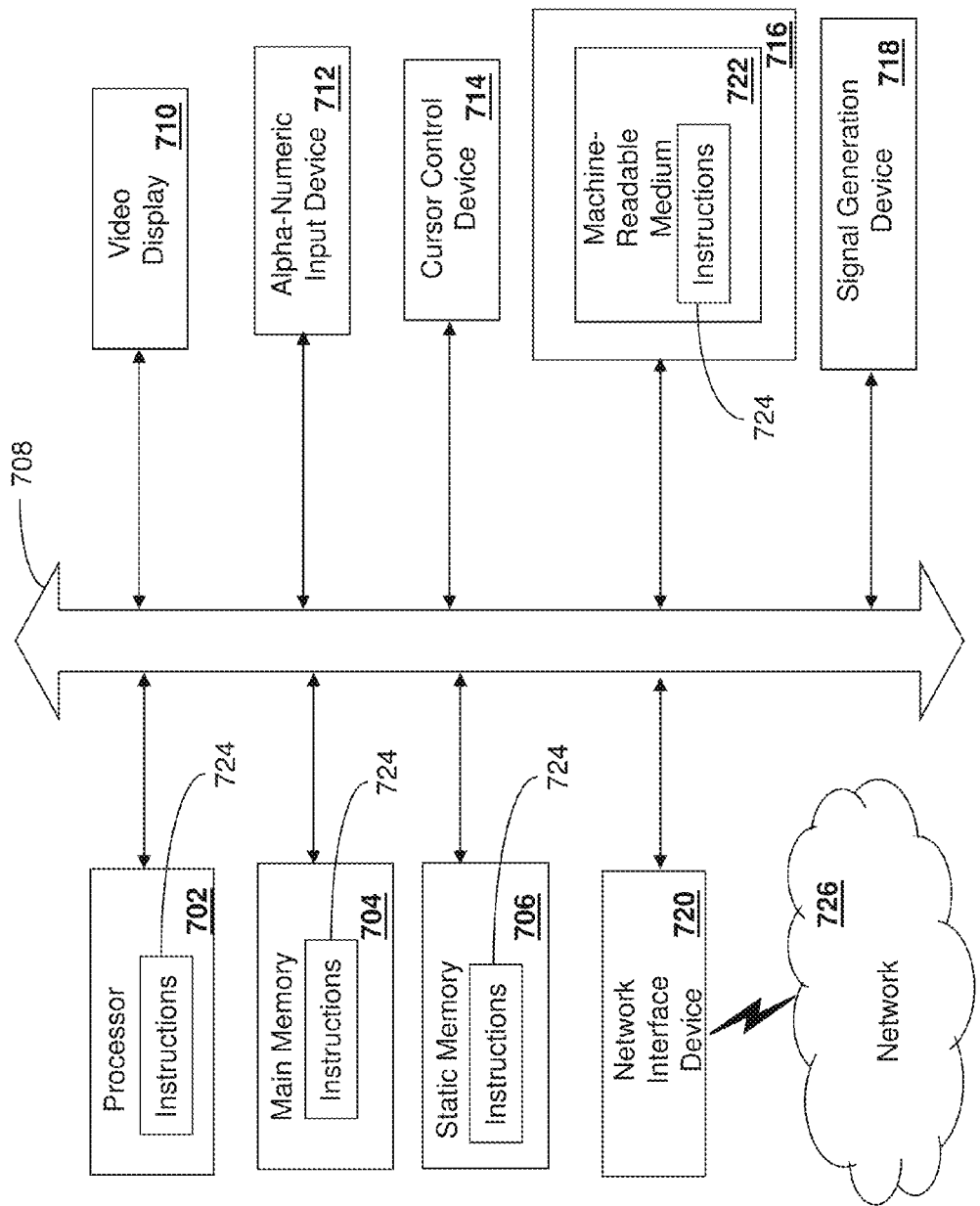
FIG. 7 depicts an illustrative diagrammatic representation of a machine in the form of a computer system within which a set of instructions, when executed, may cause the machine to perform any one or more of the methodologies disclosed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   presenting, by a processing system comprising a processor, a graphical user interface depicting a plurality of substitute actions and an accessory device, wherein the accessory device controls a software application, and wherein the plurality of substitute actions comprise substitute stimulation data for controlling the software application;
   associating, by the processing system, a first substitute action of the plurality of substitute actions with an input function of the accessory device, wherein stimulation of the input function of the accessory device produces accessory stimulus data that controls the software application differently from the first substitute action;
   recording, by the processing system, the association between the first substitute action and the input function;
   receiving, by the processing system, the accessory stimulus data from the accessory device responsive to a stimulation of the input function of the accessory device;
   detecting, by the processing system, the association of the first substitute action to the input function of the accessory device;
   obtaining, by the processing system, substitute stimulus data defined by the first substitute action;
   replacing, by the processing system, the accessory stimulus data received from the accessory device with the substitute stimulus data obtained for the first substitute action; and
   providing, by the processing system, the substitute stimulus data for controlling the software application instead of providing the accessory stimulus data.

2. The method of claim 1, wherein the substitute stimulus data is provided to an operating system that controls the software application.

3. The method of claim 1, wherein the software application is a gaming application which invokes a gaming feature according to the substitute stimulus data.

4. The method of claim 2, wherein the operating system launches another software application according to the first substitute action.

5. The method of claim 1, wherein the accessory device comprises one of a keyboard, a gaming pad, a mouse, a gaming console controller, a joystick, a microphone, or a headset.

6. The method of claim 1, wherein each of the plurality of substitute actions comprise another accessory stimulus data of another accessory device.

7. The method of claim 1, wherein recording the association comprises storing, by the processing system, the association between the first substitute action and input function in a profile.

8. The method of claim 7, further comprising associating, by the processing system, the profile with the software application.

9. A non-transitory machine-readable storage device, comprising instructions, wherein responsive to a processing system including a processor executing the instructions, the processing system performs operations comprising:
   receiving a request to associate a first substitute action of a plurality of substitute actions with an input function of a first accessory device of a plurality of accessory devices;
   associating the first substitute action with the input function of the first accessory device, wherein stimulation of the input function of the first accessory device generates accessory stimulus data that controls a software application differently from the first substitute action;
   detecting the accessory stimulus data generated by the first accessory device responsive to a stimulation of the input function;
   obtaining substitute stimulus data for the first substitute action;
   substituting the accessory stimulus data received from the first accessory device with the substitute stimulus data obtained for the first substitute action; and
   sending the substitute stimulus data for controlling the software application in place of the accessory stimulus data.

10. The non-transitory machine-readable storage device of claim 9, wherein the operations further comprise presenting in a graphical user interface the plurality of substitute actions and the first accessory device to enable associating the first substitute action with the input function of the first accessory device.

11. The non-transitory machine-readable storage device of claim 9, wherein the software application is executed by a computing device remotely located from the processor.

12. The non-transitory machine-readable storage device of claim 9, wherein the software application is executed by the processor.

13. The non-transitory machine-readable storage device of claim 9, wherein the operations further comprise storing the first substitute action in a profile.

14. The non-transitory machine-readable storage device of claim 13, wherein the operations further comprise associating the profile with the software application.

15. The non-transitory machine-readable storage device of claim 9, wherein the first substitute action comprises accessory stimulus data of a second accessory device of the plurality of accessory devices, wherein the first accessory device differs from the second accessory device.

16. The non-transitory machine-readable storage device of claim 9, wherein the first accessory device comprises one of a keyboard, a gaming pad, a mouse, a gaming console controller, a joystick, a microphone, a headset with a microphone, or any combination thereof.

17. A computing device, comprising:
a memory to store instructions; and
a processing system including a processor coupled to the memory, wherein responsive to executing the instructions, the processing system performs operations comprising:
receiving accessory stimulus data from an accessory device responsive to an input function of the accessory device being stimulated;
detecting an association between the input function of the accessory device and a substitute action of a plurality of substitute actions, wherein the substitute action comprises substitute stimulation data for controlling a software application, and wherein substitute stimulus data differs from the accessory stimulus data produced by the accessory device when the input function is stimulated;
substituting the accessory stimulus data received from the accessory device with the substitute stimulus data responsive to detecting the association; and
controlling the software application by sending the substitute stimulus data rather than the accessory stimulus data received from the accessory device.

18. The computing device of claim 17, wherein the computing device comprises the accessory device.

19. The computing device of claim 17, wherein the accessory device comprises one of a keyboard, a gaming pad, a mouse, a gaming console controller, a joystick, a microphone, a headset, or any combination thereof, wherein the software application comprises a gaming software application, and wherein the computing device comprises one of a first computer executing the gaming software application, a second computer communicatively coupled to a first gaming console executing the gaming software application, or a second gaming console executing the gaming software application.

20. The computing device of claim 17, wherein the software application is executed by a device remotely located from the computing device, and wherein the substitute stimulus data is received by the device to control the software application.

* * * * *